(12) United States Patent
Maeuser et al.

(10) Patent No.: US 6,356,236 B1
(45) Date of Patent: Mar. 12, 2002

(54) TRANSPARENT PLATE, IN PARTICULAR PARTITION GLASS PROVIDED WITH A COATING REFLECTING RADIATION AND A WINDOW PERMEABLE TO HIGH FREQUENCY RADIATION

(75) Inventors: Helmut Maeuser, Simpelveld (NL); Stefan Immerschitt, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/445,466

(22) PCT Filed: Apr. 30, 1999

(86) PCT No.: PCT/FR99/00928

§ 371 Date: May 23, 2000

§ 102(e) Date: May 23, 2000

(87) PCT Pub. No.: WO99/54961

PCT Pub. Date: Oct. 28, 1999

(30) Foreign Application Priority Data

Apr. 21, 1998 (DE) .......................................... 198 17 712

(51) Int. Cl.⁷ ............................... H01Q 1/32; H01Q 1/40
(52) U.S. Cl. ....................................... 343/713; 343/873
(58) Field of Search ............................... 343/713, 704, 343/873, 767, 770; H01Q 1/32, 1/40

(56) References Cited

U.S. PATENT DOCUMENTS 5,364,685 A * 11/1994 Nakashima et al. ......... 343/909
5,867,129 A *  2/1999 Sauer .......................... 343/713
5,986,613 A * 11/1999 Weber ......................... 343/713

* cited by examiner

Primary Examiner—Hoanganh Le
(74) Attorney, Agent, or Firm—Oblon, Spivak, McClelland, Maier & Neustadt, P.C.

(57) ABSTRACT

A transparent sheet, which may particularly be used as a glazing has a radiation-reflective coating and at least one window permeable to high-frequency radiation. The window includes an area devoid of coating. The window is formed within a region of limited continuous area of the sheet, in which the ratio of the area devoid of coating to the total area of the transparent sheet is at least 25% in the case of the distribution, when flat, of the uncoated and coated areas.

16 Claims, 2 Drawing Sheets

TRANSPARENT PLATE, IN PARTICULAR PARTITION GLASS PROVIDED WITH A COATING REFLECTING RADIATION AND A WINDOW PERMEABLE TO HIGH FREQUENCY RADIATION

BACKGROUND OF THE INVENTION

1. Field of the Invention

The present invention relates to a transparent sheet, particularly glazing provided with a coating and with a radiation window.

2. Discussion of the Background

These features are known from document DE 19 503 892 C1 which describes measures for reducing the screen effects of coated panes with respect to information-carrying microwave radiation. Glazing of this type, coated with electrically conductive and optically transparent layers, find application as thermally insulating glass, which reflects infrared radiation, and/or as glass that can be electrically heated and intended for use as glazing in buildings and vehicles.

In the case of vehicles, such glazing forms, together with a metal body, a Faraday cage which projects the interior of the vehicle against electromagnetic fields. In a building, it is also possible to protect rooms electrically by using panes provided with an electrically conductive coating and a conductive configuration on the other wail parts. Protective enclosures of this type can protect sensitive equipment, such as central computers, against disruption caused by powerful radio transmitters or by radars.

On the other hand, the protective enclosure does not let any microwave-type electromagnetic radiation pass through it, such radiation being used as a carrier wave for information. When a transmitter and/or receiver provided with an antenna is in a protected passenger compartment (vehicle), transmission problems arise. For example, vehicle position indication systems, remote control systems, identification systems and systems for recording payment charges may be subject to disruptions.

In a known manner, the layer systems may be post-structured by removing, in a linear manner, the layer previously deposited continuously, and to do so by mechanical or thermal means. In particular, exceptionally narrow slots may be made in the layer by means of laser beams. According to the aforementioned prior art, the electrically conductive layer is provided with at least one slot acting as a radiating slot, with a very short length and a very small open area, this length and open area being matched to the wavelength of the microwave radiation, via which slot the radiation energy absorbed by the conductive layer has to be re-emitted in the microwave range in the form of radiation energy. When the effective frequency for data transmission rises, for example to 5.8 GHz, as is intended for the automatic recording of payment charges on motorways, and when the slots are essentially provided for transmitting microwaves at this frequency, they are advantageously dimensioned so as so have a resonant length of $\lambda/2$, taking into account the dielectric constant of the glass. For the frequency mentioned, which corresponds to a wavelength $\lambda=52$ mm, the length L of the slots is 18 mm. Their width does not play a primary role and is, for example, 0.1 mm. The mutual separation of the slots, both in the horizontal direction and in the vertical direction, is indicated depending on the resonance and is 18 mm.

If the data is transmitted by means of circularly-polarized microwaves (i.e. the plane of instantaneous oscillation of the waves rotates about its direction of propagation in such a way that the waves oscillate within an envelope of circular form), cruciform recesses are advantageously provided in the layer. The length of the two slots is again advantageously matched to the wavelength of the microwaves used and corresponds to the value $\lambda/2$ of the waves used, caking into account the dielectric constant of the glass.

Comparative measurements relating to the attenuation of microwave radiation at a frequency of 5.8 GHz demonstrate, in the case of this prior art, that glazing made of laminated glass having radiating slots in the coating makes it possible to achieve a markedly lower attenuation of the transmission for high-frequency radiation than glazing made of coated laminated glass, and an attenuation approximately equal to that of glazing made of uncoated laminated glass is possible.

In the case of many applications, particularly in motor vehicles, it is essential to obtain, only within a relatively small limited window region, as high a radiation transmission or as low an attenuation as possible. The antenna of the on-board unit (transmitter and/or receiver) of the transmission system must be linked to this window region. The distance separating the antenna from the internal face of the glazing is predefined by the system and is, for example, equal to half the wavelength of the useful information-carrying radiation, that is to say about a few centimeters. According to the state of the art, it is not, however, always possible with individual slots in the layer uniformly distributed over the glazing face, to achieve the strong local transmission required for the systems of this type in the direct coverage region of the antenna of the on-board unit.

Glazing covered with a transparent layer, in which a checkerboard pattern is produced using a laser, is already known from document DE-A-195 41 743. This network, which extends over the entire glazing, is designed to reduce the screen effect of the glazing, provided with a layer, with respect to electromagnetic radiation. The distance separating the lines of the pattern from each other must, according to this document, be less than 2.5 cm and thus less than half the wavelength of the microwaves which are supposed to pass through the glazing. However, this document makes no reference to the ratio between the uncoated area and the coated area.

It is also known, from document DE 4 433 051 C2, how to produce a radiation window while keeping a continuous and limited area of glazing without any layer. For example, a mask is laid on the glass, or on the film, during application of the coating, or the layer material is again removed after it has been applied. Apart from the relatively high cost, somewhat undesirable side effects may appear in these constructions, such as a coloration subjectively perceived by an observer in the uncoated region. For the purpose of avoiding these effects, the surface part in question may be made opaque using a colour layer applied, for example, by screen printing. In the case of glazing made of laminated glass, the colour layer must be on the internal side of the external pane, again in front of the functional layer. This arrangement of the colour layer presents considerable disadvantages for the manufacturing technology, particularly during the process of bending the glazing. The glazing purchaser is not always willing to accept the reduction in transparent area which using glazing with a window entails.

SUMMARY OF THE INVENTION

The object of the invention is to provide glazing with a radiation window in a coating which, while being barely visible optically and able to be generally applied in the case of various system configurations, ensures good transmission of high-frequency radiation, at least in a region of limited area, without reducing the attenuation or Reflection function of the coating in the other regions.

Tests on glazing with functional layers, particularly on glazing made of laminated glass, in which a coated film is incorporated, have demonstrated that the transmission of microwaves through structured coatings (whether on glass or on a film) depends above all on the area permeable to radiation, that is to say the area free of the layer material or stripped of this material. Taking a unit area as reference, the optimum transmission value must be determined by varying the ratio of, on the one hand, the area actually permeable to radiation, or uncoated area, to, on the other hand, the total unit area.

The given total unit area is, for example, 100 mm$^2$, of which in total 25 mm$^2$ are devoid of coating. The above-mentioned ratio is therefore a quarter (25%). In regions where the layer is continuous, the quotient is therefore 0 and, in known windows free of coating over their entire surface, it is 1. Tests have confirmed that it is only when the said amount of coating removed is 25% that usable transmission properties are achieved, so that this value must be regarded as the minimum value.

The required distribution, when flat, of the uncoated areas and of those coated with a layer means that the surface elements in the window in question alternate periodically or also in an irregular manner on account of the discrete character desirable from the optical standpoint. In this regard, the upper limit of approximately 80% in the amount of layer removed is useful as a reference. This is key, on the one hand, for achieving as low as possible an attenuation of the transmission over the entire window area and, on the other hand, the uniform distribution of the structural elements also makes it possible for one and the same window to be used in general for various,s system configurations. The distribution makes it possible to some extent to achieve directivity of the window.

The ratio of the uncoated area to the total area of the radiation window is particularly easy to calculate and adjust, when the uncoated surface is formed by means of a pattern of straight lines. Its magnitude is therefore given by the product of the total number of lines multiplied by their length and their width, less, in the case of lines which cross, the area of the points of intersection (which otherwise would be counted twice). The total area is defined by the distances separating the respective outer lines. During the operation of structurizing the coating, both the width of the lines and their spacing may be varied considerably, for the purpose of achieving optimum transmission behaviour. The width of the lines may preferably vary between 0.05 and 0.5 mm, the separations between the lines possibly varying between 0.2 and 1.5 mm.

However, it is also possible to achieve the desired effect using other patterns, distributed in the window, for example with a dot screen or with emblems, such as, for example, the brands of the vehicles fitted with the glazing.

Other necessary parameters in designing the radiation window in the layer are the polarization (linear or circular polarization) of the radiation, its amplitude and its wavelength. Preferably, the recesses in the layer will be accurately matched as far as possible to the characteristics of the radiation used, in so far as this does not appreciably affect the required general use.

In the case of a circular polarization, in light of the results of the tests according to the prior art, elliptical deformation of the envelope representing the reflection from the on-board unit acting as transponder is avoided by orienting the recesses in two perpendicular directions.

The height of the communication window must furthermore take into account the oblique position of the glazing in its fitted position. The width of the communication window must be suitable for various arrangements of fixed or movable transmission/reception units of the transmission device which are located outside the vehicle.

In the case of systems for automatically collecting road payment charges, a uniform standard has not yet been established. At the present time, alternative forms for fitting fixed units in the middle of a traffic lane, as well as versions for right-hand and left-hand drive vehicles, are the subject of discussions. It is required that, within an oblong broadcasting ellipse projected onto the roadway in the region of the fixed unit, data be sufficiently correctly transmitted to the units on board vehicles. The dimensions of the ellipse are defined in terms of length by the desired and even authorized speed of travel and by the height of the fixed unit above the surface of the roadway, and in terms of width by any lateral variations within a traffic lane by the lateral orientation of the fixed units.

Individual positioning for each type of glazing seems devoid of sense: the best compromise has been found by selecting the preferred width of the communication window so that, even in the case of a lateral arrangement of the fixed unit, a sufficiently low attenuation coupled with good transmission quality is obtained.

The tests which have allowed the transmission properties of various models of radiation windows to be tested will be briefly discussed below. One particularly effective form includes a meandering structure of the layer in the communication window, with two patterns consisting of superimposed parallel straight lines, turned through 90°. In the case of the arrangement of a fixed transmission unit in a central position on the roadway and with a frequency of 5.8 GHz, an attenuation of only 3.5 dB is achieved and, in the case of a lateral arrangement with an angle of ±30°, an attenuation of 4.5 dB is achieved. These are values which do not greatly differ from the attenuation in the case of uncoated glazing or glazing provided with a radiation window over its entire area.

Measurements were carried out over a frequency range of 860 MHz to 7 GHz. Within this frequency range, the transmission attenuation is increased by at most 1.8 dB, in the case of radiation passing perpendicularly through the radiation window, compared with glazing made of standard laminated glass.

Higher attenuation values may be expected in the case of angles of incidence deviating from the perpendicular direction. Nevertheless, for angles up to ±30°, they are not greater than 3.5 dB and exceed 10 dB only in the case of angles greater than ±50°. The tests were carried out with both horizontal and vertical polarization of the radiation, without any appreciable difference being noted. A simple test construction was used comprising a fixed transmitter/receiver unit, the corresponding sheet specimen with the radiation window and the on-board unit fitted in the system at a predetermined distance to the rear of this window.

The attenuation values for glazing made of normal laminated glass and of specimens of heat-insulating layers with a structure of circles and of cruciform slots were determined for the sake of comparison: these values were all markedly higher than the aforementioned values.

By way of example, the comparative values of the transmission attenuation as a function of the angle of incidence are given in the form of a cable. Measurements were carried out on specimens of normal laminated glass ("reference") and on specimens containing the model according to the invention ("meanders"), as well as slots in the form of circles and of cruciform slots. The numbers denote attenuation values in decibels as a function of the angle of incidence, which is changed in steps of ten degrees from the vertical axis, from −30° to +30°.

The radiation used had a frequency of 5.8 GHz and a wavelength of 51.7 mm, and it was linearly polarized in the horizontal direction. The following values were measured:

| Attenuation in dB at | −30° | −20° | −10° | 0° | 10° | 20° | 30° |
|---|---|---|---|---|---|---|---|
| Reference | −2.6 | −1.8 | 0.8 | 0.8 | 1.2 | −0.2 | −1.8 |
| Meanders | −2.6 | −1.8 | 0.8 | 0 | 0.8 | −0.8 | −2 |
| Circles | −7.5 | −5.5 | −2.5 | −2.5 | −2.5 | −4.5 | −6.25 |
| Crosses | −10 | −8 | −6.5 | −6.5 | −7 | −8 | −9 |

Similar ratios, with slightly different absolute values, were measured in the case or vertical polarization of the radiation. It is clear that the differences between a preferred layer-removal model and a normal transparent sheet are negligible.

By looking at it carefully, it may be seen that the communication window is not completely visible. However, it is possible to soften the contrast and make the transition between the continuous layer and the window disappear by providing other gaps in the layer. These must have no impact from the transmission standpoint, but they may, nevertheless, improve the optical discreteness.

BRIEF DESCRIPTION OF THE DRAWINGS

Further details and advantages of the object of the invention will emerge from the drawings of an illustrative example and from the following description which accompanies it.

In the drawings.

DESCRIPTION OF THE PREFERRED EMBODIMENTS

Figure 1:
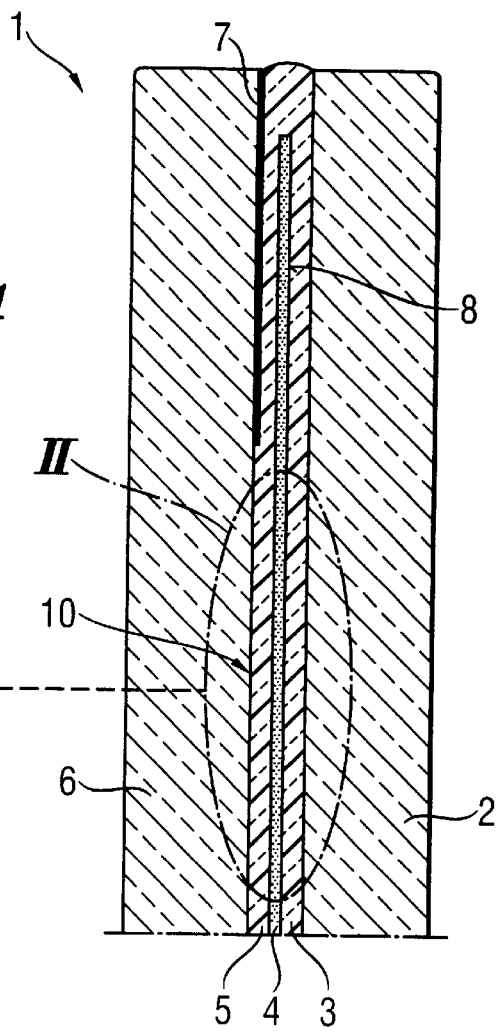
FIG. 1 is a partial sectional view, not to scale, of a transparent sheet provided according to the invention, in the form of a vehicle windscreen made of thermally insulated laminated glass.

The transparent sheet 1 shown in FIG. 1 is a laminated glass windscreen for a vehicle. The sheet 1 consists, in a known manner, of an external pane 2, a first thermoplastic adhesive layer 3 made of polyvinyl butyral (PVB) with a thickness of 0.38 mm, a thin functional coating film 4 made of a polyethylene tetephthalate (PET) with a thickness of approximately 0.1 mm, another 0.38 mm adhesive layer 5 of PVB and, finally, an inner pane 6 facing the passenger compartment. This inner pane bears, in a known manner, on its surface facing the adhesive layer, an opaque colored frame-shaped lining 7 to be fired. This layer masks a bead of adhesive, not shown here, which allows the windscreen to be fitted into the window frame of the body, in order to prevent the action of UV radiation and to block the view.

Applied on that side of the functional film 4 in contact with the adhesive layer 3 is a system comprising a thin, transparent and electrically conductive layer 8 which reflects infrared radiator, and acts as a heat-insulating layer. This thin layer is also deposited in a known manner, preferably by sputtering in the magnetic field, on the PET film, knowing that the actual functional layer is made of silver. Many suitable layer structures are known.

Along the external edge of the glazing made of laminated glass, the two PVB films are fusion-bonded to each other in a known manner all around their perimeter, so as to seal the corrosion-sensitive thin-layer system against ambient influences.

Fitted in the vehicle's passenger compartment is an antenna 9, shown only in schematic film, of an on-board unit intended for a data transmission system operating by electromagnetic radiation, for example an automatic device for recording road payment charges. A. restricted region (detail II) of the thin-layer system 8 is produced, for this purpose, in the form of a communication window or radiation window 10. In this case, the on-board unit may be produced in the form of a passive transponder which, in reaction to a received signal, sends a reply, specific to the motor vehicle, to a fixed unit. Systems are also found in which the on-board unit is combined with a rechargeable smart card, which is debited by the amount of the charge upon receiving a pulse from the fixed unit.

Figure 2:
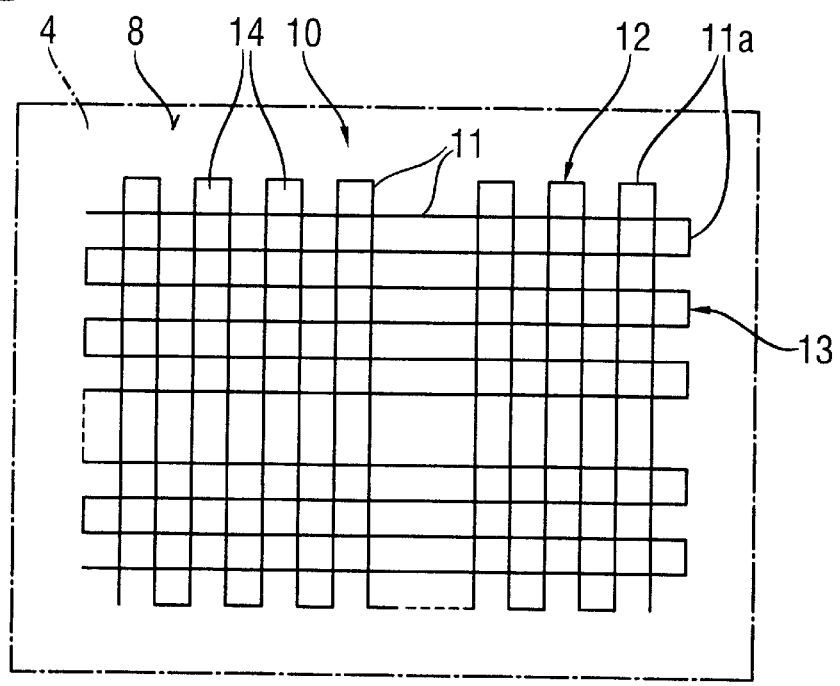
FIG. 2 is a detailed view of a communication window of the transparent sheet.

A preferred arrangement of the communication window is shown in greater detail in FIG. 2. For representational reasons, the lines are in black and the layer is in white; in reality, the lines are, of course, lighter than the region around them. In the present embodiment, the layer is removed along the fine lines 11 of a tiling pattern, the gaps between the lines of which remain intact. This pattern is produced, for example, in the form of meanders, by controlling, in a known manner, a structuring laser bear starting from an initial end and going along a first straight line 11, then a short transverse part or transition 11a, a second straight line 11 parallel to the first until level with the initial end, then once again a transition 11a in the same direction as he first transition, etc., and thus a first group 12 of parallel lines is produced. The length of the transitions 11a, joined to the ends of alternating lines, corresponds to the distances between the respective parallel lines.

After having produced the first group 12 of parallel lines, a second group 13 of mutually parallel lines, the main lines 11 of which extend perpendicular to the lines 11 of the first group, are superimposed in a similar manner on the first group 12 of parallel lines. Thus, the tiling pattern shown, having coated and included areas 14, is obtained. It is not necessary for the paths of the lines of the groups to form closed loops between them and it is possible, in fact, as shown, to leave the end points of the lines unconnected.

As already mentioned, such a pattern configuration is recommended above all in the case of the use of circularly-polarized waves. In the case of linearly-polarized waves, it is possible, if required, to make the radiation window sufficiently transparent by means of a single group of lines (vertical or horizontal lines). However, it is not absolutely necessary to orient the lines in the transparent sheet exactly with the vertical or with the horizontal, but diagonal orientations could be provided.

Tests have shown that field distortions may occur in the peripheral region if the mutual connections between the lines are omitted. Thus, points without any communication may appear in the region of the abovementioned broadcasting ellipse (the region of communication between the fixed units and the on-board units).

The manufacture of the laminated glass uses, most of the time, a prelaminate consisting of the PET film and of the adhesive film (polyvinyl butyral/EPVB), connected to its coating face for the purpose of preventing any damage that might affect the layer. The functional layers in this prelaminate mat also be structured in the desired manner should the laser bear, be slightly scattered on passing through the rough surface of the PVB film, and should it consequently be necessary to accept lines that are wider than the projected beam.

In the case of the present application, it may be concluded that the radiation window 10 provides superior transmission values when the rat o of the uncoated area to its total area is set at values of between 25% and 80%. The width of the entire window depends in the end on the external properties of the system (such as the arrangement of the transmission units fixed to the roadway and the directivity). In all cases, it must be greater than the height, which may be determined essentially from the wavelength ant from the amplitude of the radiation used, as well as the inclined position of the glazing in its fitted position, by means of simple tests. Very good results have been obtained for all the conceivable types of implementation with a width of 200 mm and a length of 100 mm.

In this case, the width of the lines preferably lies within a range of between 0.1 and 0.4 mm.

Figure 3:
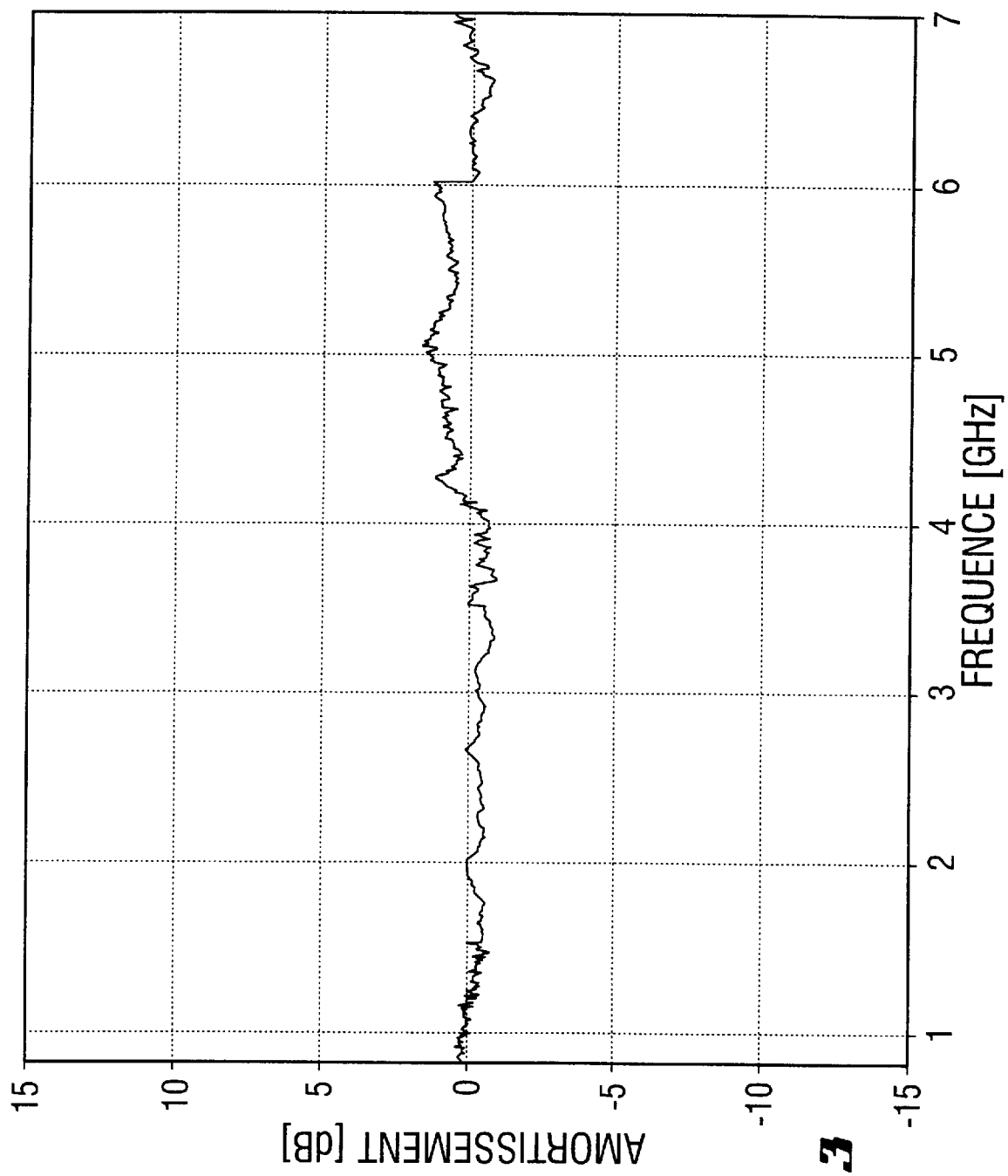
FIG. 3 is a diagram showing the difference in attenuation between glazing made of laminated glass, locally uncoated, and a sheet provided with the communication window detailed here, as a function of the frequency of the information-carrying radiation.

Finally, FIG. 3 shows the difference in attenuation between a specimen provided with a window, 120×100 mm$^2$ in size, entirely without a layer and a specimen provided with a structured radiation window like the one detailed above. For similar external dimensions of 120×100 mm$^2$, the functional layer in the specimen window was uniformly structured in the form of 0.3 mm wide lines separated by distances of 1.5 mm, the ratio of the uncoated area to the total area of the window being almost 31%.

The attenuation in decibels is plotted as a function of the frequency in gigahertz. The maximum difference occurs at approximately 5 GHz and at this point is approximately 1.8 dB.

What is claimed is:

1. A transparent sheet covered with a reflecting coating, comprising:
    at least one window having an uncoated area permeable to high-frequency radiation, wherein:
        said window is formed in a region of limited area made as one piece with said transparent sheet,
        and wherein,
            a ratio of the uncoated area to a total area of the transparent sheet is between 25% and 80%.
2. The transparent sheet according to claim 1, wherein said window has a pattern of uncoated lines, and areas coated as one piece, and said areas coated as one piece are separated from each other by said lines.

3. The transparent sheet according to claim 2, wherein said pattern comprises at least one group of parallel meandering lines connected together in pairs at their alternating ends by transitions.

4. The transparent sheet according to claim 3, wherein said pattern comprises two mutually perpendicular groups of lines which are parallel to each other.

5. The transparent sheet according to claim 3, wherein the mutual separations of the lines defined by the transitions are between 0.2 and 1.5 mm.

6. The transparent sheet according to claim 2, wherein a width of said lines is between 0.05 and 0.5 mm.

7. The transparent sheet according to claim 1, wherein a structuring laser forms said region as a continuous layer.

8. The transparent sheet according to claim 1, wherein said window has a horizontal extent of 200 mm and a vertical extent of 100 mm.

9. The transparent sheet according to claim 1, further comprising lining elements provided along an edge of said window optically masking a transition between said layer region and said window.

10. A transparent sheet covered with a reflective coating, comprising:
    at least one window having an uncoated area permeable to high-frequency radiation,
    wherein,
        said window has a pattern of uncoated lines, and areas coated as one piece,
        said areas coated as one piece are separated from each other by said lines,
        said pattern comprising at least one group of parallel meandering lines connected together in pairs at their alternating ends by transitions,
        said window is formed in a region of limited area made as one piece with said transparent sheet,
        a ratio of uncoated area to the total area of said transparent sheet is between 25% and 80%.
11. The transparent sheet according to claim 10, wherein said pattern comprises two mutually perpendicular groups of lines which are parallel to each other.

12. The transparent sheet according to claim 10, wherein the mutual separations of the lines defined by the transitions are between 0.2 and 1.5 mm.

13. The transparent sheet according to claim 10, wherein a width of said lines is between 0.05 and 0.5 mm.

14. The transparent sheet according to claim 10, wherein a structuring laser forms said region as a continuous layer.

15. The transparent sheet according to claim 10, wherein said window has a horizontal extent of 200 mm and a vertical extent of 100 mm.

16. The transparent sheet according to claim 10, further comprising lining elements provided along an edge of said window optically masking a transition between said layer region and said window.

* * * * *

UNITED STATES PATENT AND TRADEMARK OFFICE
CERTIFICATE OF CORRECTION

PATENT NO. : 6,356,236 B1
DATED : March 12, 2002
INVENTOR(S) : Maeuser et al.

It is certified that error appears in the above-identified patent and that said Letters Patent is hereby corrected as shown below:

<u>Title page,</u>
Item [22], the PCT information should read:

-- [22] PCT Filed: Apr. 20, 1999 --

Signed and Sealed this

Twenty-fourth Day of September, 2002

*Attest:*

*Attesting Officer*

JAMES E. ROGAN
*Director of the United States Patent and Trademark Office*